UNITED STATES PATENT OFFICE.

FRITZ ACH, OF MANNHEIM, ASSIGNOR TO C. F. BOEHRINGER & SOEHNE, OF WALDHOF, NEAR MANNHEIM, GERMANY.

PROCESS OF PREPARING VANILLIN.

SPECIFICATION forming part of Letters Patent No. 487,204, dated November 29, 1892.

Application filed March 22, 1892. Serial No. 425,941. (No specimens.)

*To all whom it may concern:*

Be it known that I, FRITZ ACH, a citizen of the German Empire, residing at Mannheim, in the Grand Duchy of Baden, German Empire, have invented certain new and useful Improvements in the Art of Preparing Vanillin; and I do hereby declare the following to be a full, clear, and exact description of the invention, such as will enable others skilled in the art to which it appertains to make and use the same.

My invention relates to the preparation of vanillin from eugenol, and especially to the transformation of isoeugenol benzyl-ether into vanillin; and its object is to make the process more simple, effective, and economical than the methods heretofore employed for this purpose.

For this purpose my invention consists in the methods, steps, and features described in the specification, and pointed out in the claims annexed.

In preparing vanillin from isoeugenol it is necessary to protect the phenol group of the latter during the oxidation that has to be effected. Heretofore this was effected by the introduction of organic-acid residues, which after the oxidation could be readily separated from the vanillin derivatives obtained. With this process it was always necessary before the introduction of the organic-acid residue to convert the eugenol with more or less difficulty into isoeugenol and to isolate the latter in a pure condition. I have succeeded by the introduction of certain alcoholic residues into the eugenol—such, for example, as the benzyl group—in obtaining derivatives of eugenol which allow of a ready transformation into derivatives of isoeugenol without requiring the previous isolation of the isoeugenol. These derivatives offer the advantage in the preparation of the vanillin of containing a phenol group which is protected against oxidation, and that after the oxidation has taken place the separation thereof can be readily effected.

In the following will be described what I consider the best manner of carrying out my invention, and which consists in the preparation of vanillin by means of eugenol benzyl-ether.

The operation is divided into four parts: first, preparation of eugenol benzyl-ether; second, transformation of the eugenol benzyl-ether into isoeugenol benzyl-ether; third, production of vanillin benzyl-ether (meta-methoxybenzaldehyde-parabenzyl-ether) by oxidation of the isoeugenol benzyl-ether; fourth, conversion of the vanillin benzyl-ether into vanillin.

I.—One kilogram of eugenol is dissolved in three kilos rectified spirits and to this are added, first, three hundred and fifty grams caustic potash dissolved in a small quantity of water, and, secondly, eight hundred grams of benzyl chloride, or (corresponding molecular quantities of benzyl iodide or bromide,) and the whole is heated on the water-bath with a reflux-cooler. The greater portion of the spirits is distilled off, and by the addition of water eugenol benzyl-ether, which separates as a heavy oil, is precipitated. For separating any eugenol that may not have been converted the oil is shaken up with dilute alkali and the eugenol benzyl-ether thus purified is then distilled in a partial vacuum. The eugenol benzyl-ether thus obtained is a colorless oil which solidifies in strong prisms, having a melting-point of 29° to 30° centigrade. Its formula is:

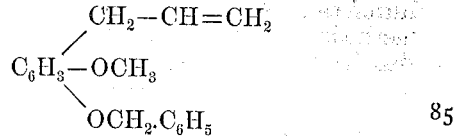

II.—One kilogram eugenol benzyl-ether (preferably such as is obtained by the preceding process) is dissolved in five kilograms rectified spirits and 2.5 kilograms of pulverized caustic potash are added and the whole is then kept at the boiling-point for from sixteen to twenty-four hours in a reflux-cooler. The greater part of the alcohol is then distilled off and water is added to the residue, whereupon a brown-colored oil separates on the surface of the aqueous alkaline solution and which soon solidifies to a yellowish-brown crystalline mass. This can be purified by pressing and recrystallizing from alcohol, thus obtaining isoeugenol benzyl-ether in fine felted needles, having the melting-point of 50° to 59° centigrade. Its formula is:

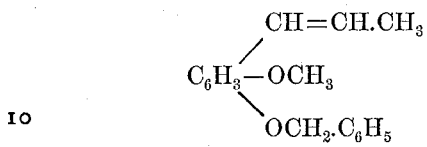

III.—The oxidation of the isoeugenol benzyl-ether is effected while observing the precautions employed in the preparation of aldehyde by oxidation in the following manner: A solution of 1.5 kilograms of sodium-chromate is poured slowly into a mixture of two kilograms of sulphuric acid and ten kilograms of water and the mixture added to the isoeugenol benzyl-ether. On completion of the oxidation the product which I term "vanillin benzyl-ether" (or metamethoxybenzaldehyde-parabenzyl-ether) is well cooled and disengaged by filtration from the separated aldehyde. It is purified by recrystallization out of rectified spirits, and is thus obtained in fine needles of transparent plates whose melting-point is 63° to 64° centigrade. The formula of this new product is:

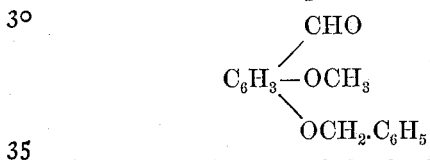

IV.—One kilogram of the finely-pulverized vanillin benzyl-ether has poured over it five kilograms fuming hydrochloric acid and the mixture is allowed to stand for twenty-four hours in the cold. Instead of the hydrochloric acid, I may add hydrobromic or hydroiodic acid, although I consider hydrochloric acid preferable. The crystals are thereby destroyed, vanillin is produced in solution, and benzyl-chloride is separated and floats on top and can be used over again. The separation is effected very readily. The vanillin in solution can be isolated according to the known methods and possesses all its usual properties, its formula being:

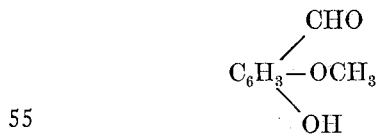

I do not herein claim the eugenol benzyl-ether or the process of obtaining the same, the same constituting the subject-matter of another application filed by me July 5, 1892, Serial No. 439,029. Nor do I herein claim the isoeugenol benzyl-ether or the process of obtaining the same, inasmuch as the same constitutes the subject-matter of another application filed by me October 7, 1892, Serial No. 448,148.

While I consider the above the preferable manner of carrying out my invention, I desire it to be understood that the process thus set forth may be modified in many particulars without departing from the essence of my invention. Thus, for example, as already stated, instead of the benzyl chloride employed in the first step or sub-process I may employ other halogen compounds of benzyl, as benzyl iodide or bromide, and instead of the caustic potash employed in the first or second step or sub-process I may sometimes use other alkali hydrates. It is also to be noted that the eugenol derivative employed in each succeeding step or sub-process may be produced by other processes and in other ways than those herein set forth. I do not, therefore, desire to be limited to the exact details and steps hereinbefore set forth; but

What I claim, and desire to secure by Letters Patent, is—

1. The process which consists in adding sodium chromate to a mixture of sulphuric acid and water and then adding the mixture to isoeugenol benzyl-ether, substantially as set forth.

2. The process which consists in adding sodium chromate to a mixture of sulphuric acid and water, then adding the mixture to isoeugenol benzyl-ether, and then cooling and removing the aldehyde formed as a by-product by filtration, substantially as set forth.

3. As a new compound, vanillin benzyl-ether having the formula hereinbefore stated, which crystallizes in fine needles or transparent plates having a melting-point of 63° to 64° centigrade.

4. In the art of obtaining vanillin, the process which consists in adding hydrochloric acid to vanillin benzyl-ether and allowing the mixture to stand, substantially as set forth.

5. In the art of obtaining vanillin, the process which consists in pouring fuming hydrochloric acid over finely-powdered vanillin benzyl-ether and allowing the mixture to stand, substantially as set forth.

6. In the art of obtaining vanillin, the process which consists in the following steps: first, dissolving eugenol in alcohol, adding thereto alkaline hydrate and a halogen compound of benzyl, and heating the mixture; second, dissolving the resulting eugenol benzyl-ether in alcohol, adding thereto alkaline hydrate, keeping the same at the boiling-point for some time, then partially distilling off the alcohol, and adding water to the residue; third, adding to the resulting isoeugenol benzyl-ether a mixture of sodium chromate, sulphuric acid, and water, and, finally, adding hydrochloric acid to the resulting vanillin benzyl-ether, substantially as set forth.

In testimony whereof I affix my signature in presence of two witnesses.

FR. ACH.

Witnesses:
 FERD. BOPP,
 CH. HEILER.